Nov. 6, 1923.
H. H. STYLL
LENS
Filed April 29, 1921
1,473,360
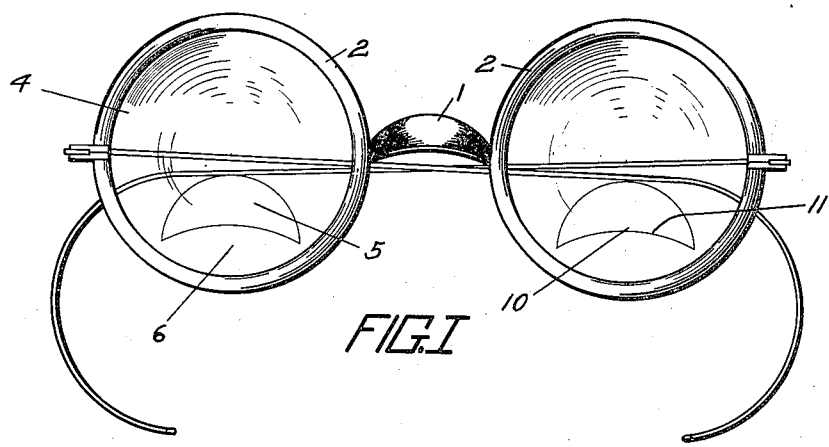
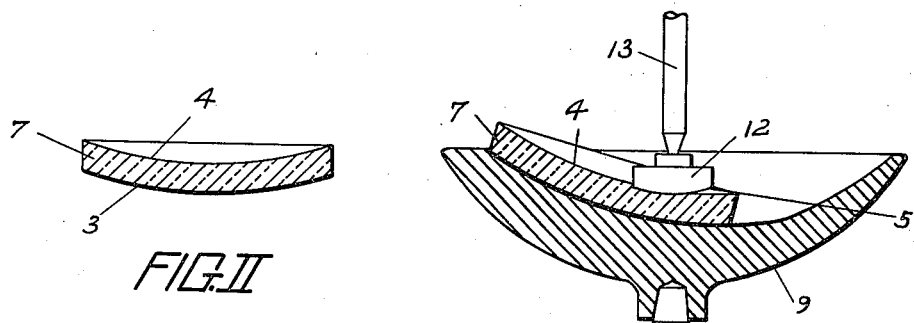
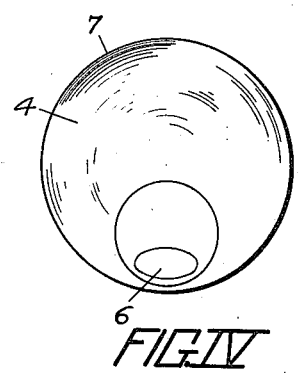 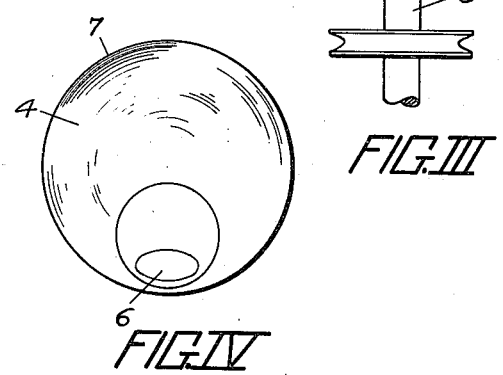
INVENTOR
HARRY H STYLL
BY
ATTORNEYS Patented Nov. 6, 1923.

1,473,360

UNITED STATES PATENT OFFICE.

HARRY H. STYLL, OF SOUTHBRIDGE, MASSACHUSETTS.

LENS.

Application filed April 29, 1921. Serial No. 465,486.

*To all whom it may concern:*

Be it known that I, HARRY H. STYLL, a citizen of the United States, residing at Southbridge, in the county of Worcester and State of Massachusetts, have invented certain new and useful Improvements in Lenses, of which the following is a specification.

This invention relates to improvements in ophthalmic lenses and has for its principal object the provision of a novel and improved construction of bifocal or multifocal lens; that is to say, a lens having portions adapted for vision at different distances.

One of the principal objects of the present invention is the provision of a lens of this type which will give the user portions similar to the ordinary bifocal or multifocal lens capable of use for distance and near vision, respectively, and which will in addition furnish the user with a portion not ordinarily present which will afford distance vision at the bottom of or beneath the normal near vision portion of the lens. This is extremely desirable for those who are out of doors a considerable period of the time and desire to use a lens both for looking at the ground, at steps, or the like for distant vision, and also to have a portion for reading work when desired, but in which the reading may ordinarily be considered as incidental to the more important distant vision use of the lens.

Other objects and advantages of my improved construction should be readily understood by reference to the following specification taken in connection with the accompanying drawings, and it will be understood that I may make any modifications in the specific details of construction or process of producing the lens within the scope of the appended claims without departing from or exceeding the spirit of the invention.

Figure I represents a front view of a mounting embodying my improved lenses.

Figure II represents a sectional view through the lens in process of manufacture.

Figure III illustrates a similar view illustrating a further step in the production of the lens.

Figure IV represents a plan view of a modified form of lens.

In the drawings, the numeral 1 designates a bridge or center of an ophthalmic mounting, having the frames 2 in which are mounted my improved lenses consisting of a glass disc or blank having on one side the bounding surface 3 and on the opposite side the surfaces 4 and 5, the surface 4 forming the major or distance vision field, and the surface 5 the minor or reading field.

Prior to my invention it has been customary to construct lenses of this type having an enclosed reading field with a field either circular or oval in outline and extending to the lower edge of the lens. It is to be noted in my improved lens that the outline of the reading portion in place of being circular is of crescent formation with the corners of the crescent turned downward. The advantage of this construction resides in the fact that desired width of reading portion is attained for satisfactory reading use, while vertical extent of the reading portion is limited and a space at 6 provided in the completed lens forming a part of the distance vision curve and facilitating vision, as when looking at the ground, ascending or descending steps, or similar uses.

In the formation of my improved lens I take the blank 7, which may or may not have the final surface 3 formed thereon, and form on the blank a suitable curve 4 for the distant vision portion. It will be noted that I have shown this lens as of meniscus formation but it is to be understood that flat or other shapes may be employed without departing from or exceeding my invention. The surface 4 having been formed on the lens I then mount it eccentrically on the spindle 8, the lens being carried by a holder 9 which is of such shape as to hold the lens tilted in a vertical meridian as respects the finished lens, as will be best understood by reference to Figure III. In any event, the position of the blank 7 upon the holder 9 is such that the center point 10 of the circumscribing arcuate division line 11 bounding the near vision field will lie in the axis of the spindle 8. The lens being so mounted the spindle 8 is preferably revolved and at the same time the lens abraded by a tool 12 preferably rigidly held as on the spindle 13 which serves to cut into the material of the blank producing the reading curve 5.

In view of the tilted mounting of the blank 7 with respect to its axis of rotation the tool will first bite in at the inner edge of the bounding line 11 or edge nearest the center of the lens and will gradually work out toward the edge of the lens. This grinding is continued until the desired shape of reading portion such as the crescent formation illustrated in Figure I, or the substantially circular portion with enclosed unground surface 6, shown in Figure IV, is produced, at which time the grinding is stopped and the surface suitably polished. In a lens so produced it will be found that there will be a cliff at the point of intersection of the distance and reading fields at the top and a merged line of joinder between the reading and the supplemental distance section at the bottom. It will further be found that by my improved process of grinding I have produced what is in all substantial respects a trifocal lens with but two grinding and polishing portions, and at the same time I have provided an extremely desirable and efficient form of section for each of the intended purposes.

I claim:

1. A one-piece bifocal lens having a crescent shaped reading portion intermediately located on the lens, and a distance portion below and partially enclosed by the crescent of the reading portion.

2. A one-piece bifocal lens having a crescent shaped near vision portion disposed between the center and edge of the lens.

3. A multifocal lens comprising a unitary piece of glass having a distance field, a crescent shaped reading field cut thereinto, and a supplemental distance portion disposed between the horns of the crescent.

4. A multifocal lens comprising a blank having a distance field, a crescent shaped reading field cut thereinto, and a supplemental distance portion disposed between the horns of the crescent, said lens being formed from a single piece of material.

5. The process of producing a multifocal lens consisting in forming a distant vision curve and cutting away a portion of said distant vision surface at an angle to produce a crescent shaped reading field.

6. The process of producing a one-piece multifocal lens consisting in forming a blank with a distant vision surface, rotating said blank about a non radial axis as respects said surface, and abrading an axial portion of the blank as rotated, substantially as and for the purpose described.

7. The process of producing a one-piece multifocal lens consisting in forming a blank with a distant vision surface, rotating said blank about a non radial axis as respects said surface, and abrading an axial portion of the blank as rotated to produce a crescent shaped supplemental surface on the blank.

8. The process of producing a one-piece multifocal lens consisting in forming a blank with a distant vision surface, rotating said blank about a non radial axis as respects said surface, abrading an axial portion of the blank as rotated to produce a crescent shaped supplemental surface on the blank, and stopping the grinding before the entire enclosed distance vision surface has been ground away.

In testimony whereof I have affixed my signature, in presence of two witnesses.

HARRY H. STYLL.

Witnesses:
 ALICE G. HASKELL,
 SUSAN CASAZZA.